United States Patent
Moroski et al.

(10) Patent No.: US 11,755,363 B2
(45) Date of Patent: Sep. 12, 2023

(54) FRAMEWORK FOR WORKFLOW EXTENSIBILITY IN A CLOUD COMPUTING SYSTEM

(71) Applicant: VMware, Inc., Palo Alto, CA (US)

(72) Inventors: Jeffrey Moroski, South Abington Township, PA (US); Praagyan Pokharel, Somerville, MA (US); Colm Caffrey, Palo Alto, CA (US); Ishita Saxena, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 300 days.

(21) Appl. No.: 15/383,591

(22) Filed: Dec. 19, 2016

(65) Prior Publication Data
US 2018/0173561 A1     Jun. 21, 2018

(51) Int. Cl.
    G06F 9/48       (2006.01)
    H04L 67/10      (2022.01)
    G06F 9/50       (2006.01)
    G06F 9/455      (2018.01)

(52) U.S. Cl.
    CPC ........ G06F 9/4843 (2013.01); G06F 9/45558 (2013.01); G06F 9/4856 (2013.01); G06F 9/5088 (2013.01); H04L 67/10 (2013.01); G06F 9/5038 (2013.01); G06F 2009/4557 (2013.01); G06F 2009/45595 (2013.01)

(58) Field of Classification Search
    CPC .... G06F 9/4843; G06F 9/5088; G06F 9/4856; G06F 9/45558; G06F 2009/4557; G06F 2009/45595; G06F 9/5038; H04L 67/10; H04L 41/5077
    See application file for complete search history.

(56) References Cited

U.S. PATENT DOCUMENTS

| | | | | |
|---|---|---|---|---|
| 7,697,026 | B2* | 4/2010 | Vallone | H04N 5/77 348/148 |
| 8,566,479 | B2* | 10/2013 | Rajendran | G06F 12/0284 710/3 |
| 9,756,094 | B1* | 9/2017 | Lewis | H04L 65/612 |
| 2006/0064297 | A1* | 3/2006 | Sugishita | G06F 9/505 703/24 |
| 2008/0127124 | A1* | 5/2008 | Gilfix | G06F 9/44 717/136 |
| 2009/0099882 | A1* | 4/2009 | Karabulut | G06Q 10/06 713/152 |
| 2011/0191788 | A1* | 8/2011 | Jacobson | G06F 9/45537 719/328 |
| 2013/0219388 | A1* | 8/2013 | Moeller | G06F 9/45558 718/1 |
| 2013/0262378 | A1* | 10/2013 | Wilson | G06Q 10/00 707/611 |

(Continued)

*Primary Examiner* — Michael W Ayers
(74) *Attorney, Agent, or Firm* — Patterson + Sheridan, LLP

(57) ABSTRACT

An example method of extending a cloud director configured to manage a cloud computing system includes: receiving requests to register external services with the cloud director; generating phase associations between the external services and an extensible phase of a workflow of the cloud director; executing the workflow of the cloud director and, in response to reaching the extensible phase, determining an execution order for at least one of the phase associations; and sending a message from the cloud director to each external service of the at least one phase association based on the execution order.

20 Claims, 6 Drawing Sheets

(56) References Cited

U.S. PATENT DOCUMENTS

| | | | |
|---|---|---|---|
| 2014/0123239 A1* | 5/2014 | Fukuda | H04L 63/104 726/4 |
| 2014/0282510 A1* | 9/2014 | Anderson | G06F 9/45558 718/1 |
| 2015/0186192 A1* | 7/2015 | Dyakin | G06F 9/54 719/313 |
| 2016/0014293 A1* | 1/2016 | Iwai | H04N 1/00949 358/1.15 |
| 2016/0065417 A1* | 3/2016 | Sapuram | G06Q 30/0631 709/223 |
| 2016/0110666 A1* | 4/2016 | Rahmouni | G06Q 10/067 705/7.23 |

\* cited by examiner

FRAMEWORK FOR WORKFLOW EXTENSIBILITY IN A CLOUD COMPUTING SYSTEM

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capabilities from both private and public clouds. A private cloud can include one or more customer data centers (referred to herein as "on-premise data centers"). The public cloud can include a multi-tenant cloud architecture providing IaaS cloud services. In a hybrid cloud system, it is desirable to support VM migration between the data center and the public cloud. Presently, to implement VM migration, a customer must first create a VM from scratch within the public cloud and then transfer data from a powered-off source VM in the on-premise data center to the newly created VM in the public cloud. This process has the disadvantage of significant downtime for the VM being migrated.

SUMMARY

One or more embodiments provide techniques for providing a framework for workflow extensibility in a cloud computing system. In an embodiment, a method of extending a cloud director configured to manage a cloud computing system includes: receiving requests to register external services with the cloud director; generating phase associations between the external services and an extensible phase of a workflow of the cloud director; executing the workflow of the cloud director and, in response to reaching the extensible phase, determining an execution order for at least one of the phase associations; and sending a message from the cloud director to each external service of the at least one phase association based on the execution order.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more embodiments provide techniques for providing a framework for workflow extensibility in a cloud computing system. In embodiments, an extensibility framework is provided that allows externally written services (referred to as external services or extensions) to be registered with a cloud director in a cloud computing system.

Figure 1:
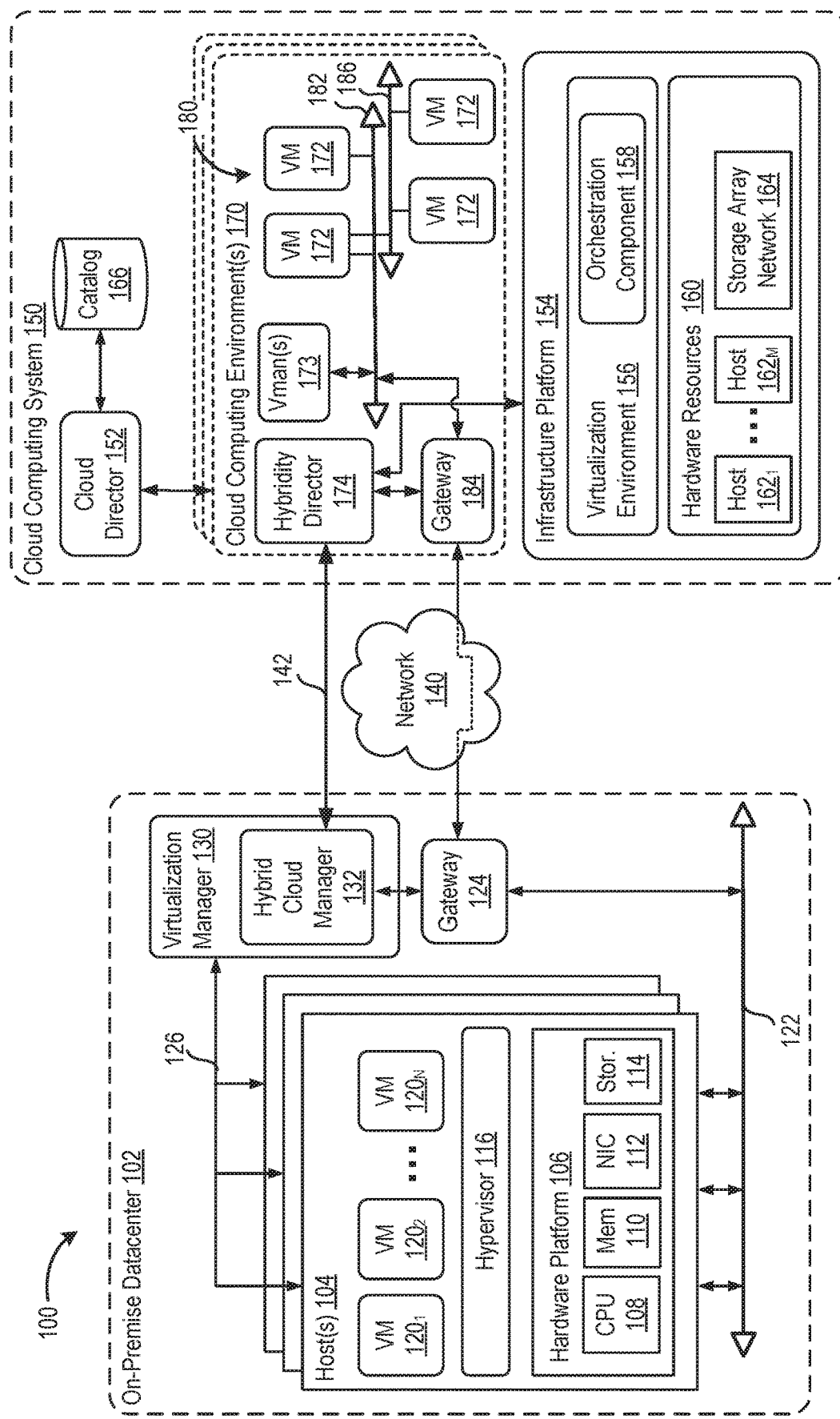
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system implementing an on-premise data center 102 and a virtualized computing system implementing a cloud computing system 150. Hybrid cloud computing system 100 is configured to provide a common platform for managing and executing virtual workloads seamlessly between on-premise data center 102 and cloud computing system 150. In one embodiment, on-premise data center 102 may be a data center controlled and administrated by a particular enterprise or business organization, while cloud computing system 150 may be operated by a cloud computing service provider and exposed as a service available to account holders, such as the particular enterprise in addition to other enterprises. As such, on-premise data center 102 may sometimes be referred to as a "private" cloud, and cloud computing system 150 may be referred to as a "public" cloud. While the example of FIG. 1 includes on-premise data center 102, in some embodiments, on-premise data center 102 can be omitted.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

On-premise data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within on-premise data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

On-premise data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in on-premise data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in on-premise data center 102 with connectivity to an external network 140 (e.g., Internet). Gateway 124 may manage external public IP addresses for VMs 120 and route traffic incoming to and outgoing from on-premise data center 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to on-premise data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates, packaged virtual machine applications, virtual data centers, and the like that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. A virtual data center includes one or more virtual machines that provides a pool of resources. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within on-premise data center 102. In other embodiments, gateway 184 may be configured to connect to communicate with on-premise data center 102 using a high-throughput, dedicated link (depicted as a direct connect 142) between on-premise data center 102 and cloud computing system 150. In one or more embodiments, gateways 124 and 184 are configured to provide a "stretched" layer-2 (L2) network that spans on-premise data center 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in on-premise data center 102 to enable a common virtualized computing platform between on-premise data center 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

In an embodiment, cloud director 152 includes an extensibility framework that allows external processes to influence decisions made by cloud director 152. In particular, the extensibility framework allows externally written services (referred to as "extensions") to be registered with cloud director 152 and then associated with specific workflow phases associated with any object. The phase associations can be scoped to specific selectors, such as organization, virtual data center, and the like. The extensibility framework of cloud director 152 is described further below.

Figure 2:
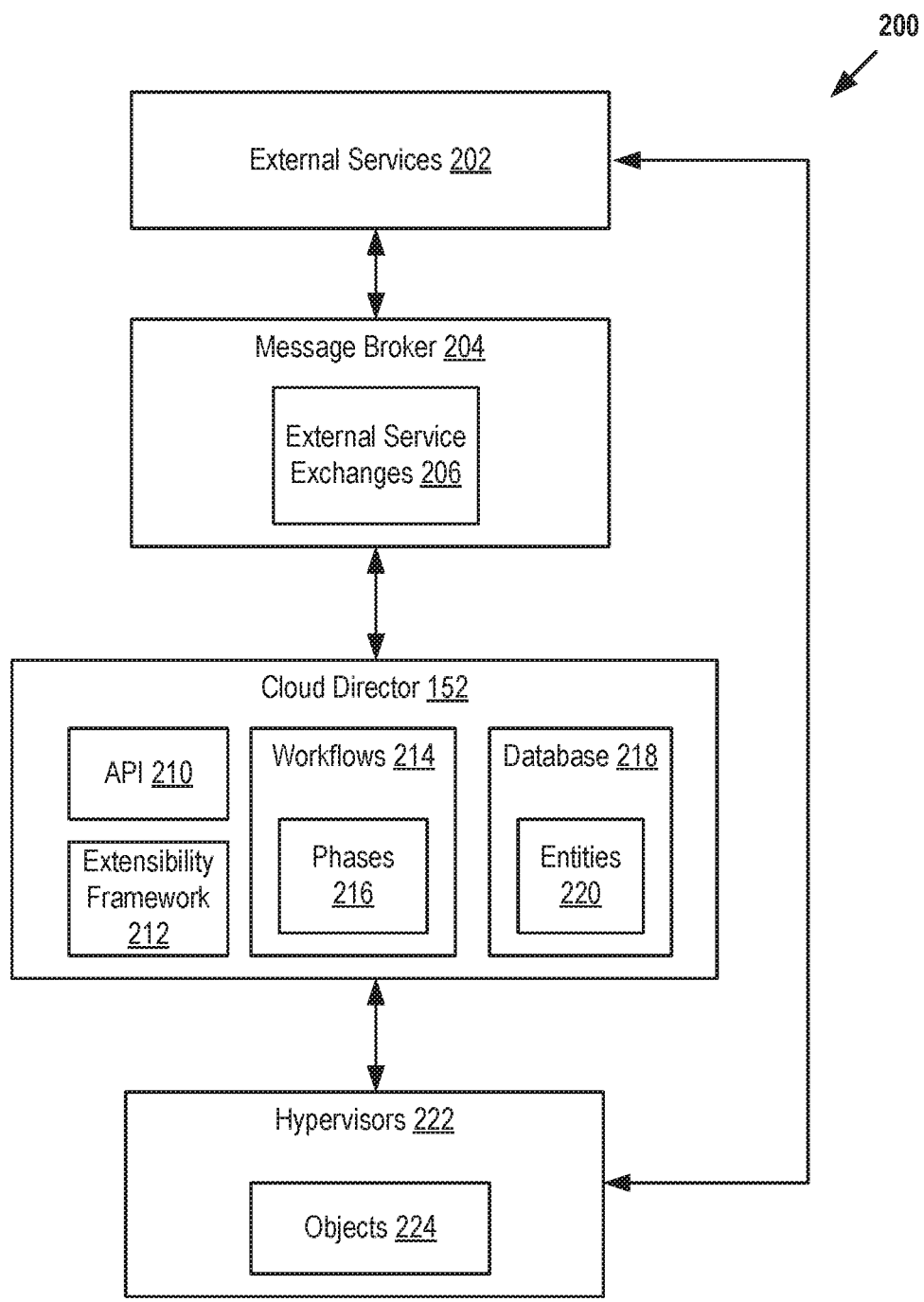
FIG. 2 is a block diagram depicting a cloud management system according to an embodiment.

FIG. 2 is a block diagram depicting a cloud management system 200 according to an embodiment. Cloud management system 200 includes external services 202, a message broker 204, cloud director 152, and hypervisors 222. Each external service 202 is software executing within a software platform (e.g., an operating system) installed in a computing system or virtual machine. For example, external services 202 can be executing on VMs 172 of a virtual data center 180, directly on a hardware platform of a computing system, or the like. Message broker 204 is software configured to exchange messages between software components, such as between cloud director 152 and external services 202. In an embodiment, message broker 204 implements the Advanced Message Queuing Protocol (AMQP) for queuing and routing of messages. An example message broker 204 that employs AMQP is RabbitMQ™, which is open-source software available from Pivotal Software, Inc. located in London, England. Message broker 204 can include one or more software components executing on VMs 120, VMs 172, and/or directly on hardware platform(s) of computing system(s). Hypervisors 222 are managed by cloud director and are part of virtualization environment 156 in cloud computing system 150.

Cloud director 152 includes an API 210, an extensibility framework 212, workflows 214, and a database 218. API 210 can be a REST API, as described above, and provides an external interface to cloud director 152. Database 218 stores various entities 220, which are objects managed by cloud director 152.

In an embodiment, a cloud system administrator interacts with cloud director 152 to delegate resources to a tenant. The tenant can then interact with cloud director 152 to organize those resources into one or more virtual data centers (vDCs). Provider vDCs serve compute capacity to tenant vDCs. In general, tenants cannot see provider vDCs and cloud director 152 chooses an appropriate provider vDC when a tenant requests a new tenant vDC. Once a tenant vDC has been provisioned, the tenant can interact with cloud director 152 for workload provisioning, including VM placement and VM deployment. VM placement evaluates the incoming requirements for VM creation (e.g., memory sizing, disk sizing, storage profiles, etc.). VM deployment creates VMs using the results from VM placement. Entities 220 include provider vDCs, tenant vDCs, VMs, hosts, datastores, virtual network resources, resource pools, and the like. Workflows 214 include processes performed by cloud director 152 to manage entities 220, such as vDC instantiation, VM placement, VM deployment, and the like. An administrator can access cloud director 152 through API 210 to trigger execution of workflows 214.

Each workflow 214 includes one or more phases 216. Entities 220 include one or more phases, such as pre-create, create, post-create, delete, etc. A phase 216 can perform a particular phase of an entity 220, such as gathering resource requirements, calculating a solution, creating an entity, and the like. In an embodiment, phase(s) 216 of a given workflow 214 can be made extensible using extensibility framework 212 ("extensible phases"). Each extensible phase supports messaging with external service(s) 202, which can then perform some work. The messages sent to external services 202 can include information that enables external services 202 to access relevant information maintained by cloud director 152 (e.g., information about entities 220). The messages can also include information for accessing information about objects 224 directly in hypervisors 222. Objects 224 can include VMs, datastores, virtual network resources, resource pools, and the like. Extensibility framework 212 is described further below.

Cloud director 152 can send messages to external services 202 through message broker 204. In some cases, cloud director 152 can receive messages from external services 202 through message broker 204. Message broker 204 includes external service exchanges 206. Each external service 202 is associated with an external service exchange 206, which provides a target for messages. An external service exchange 206 also provides a target for reply messages from a respective external service 202. Messaging between cloud director 152 and external services 202 through message broker 204 is described further below.

Figure 3:
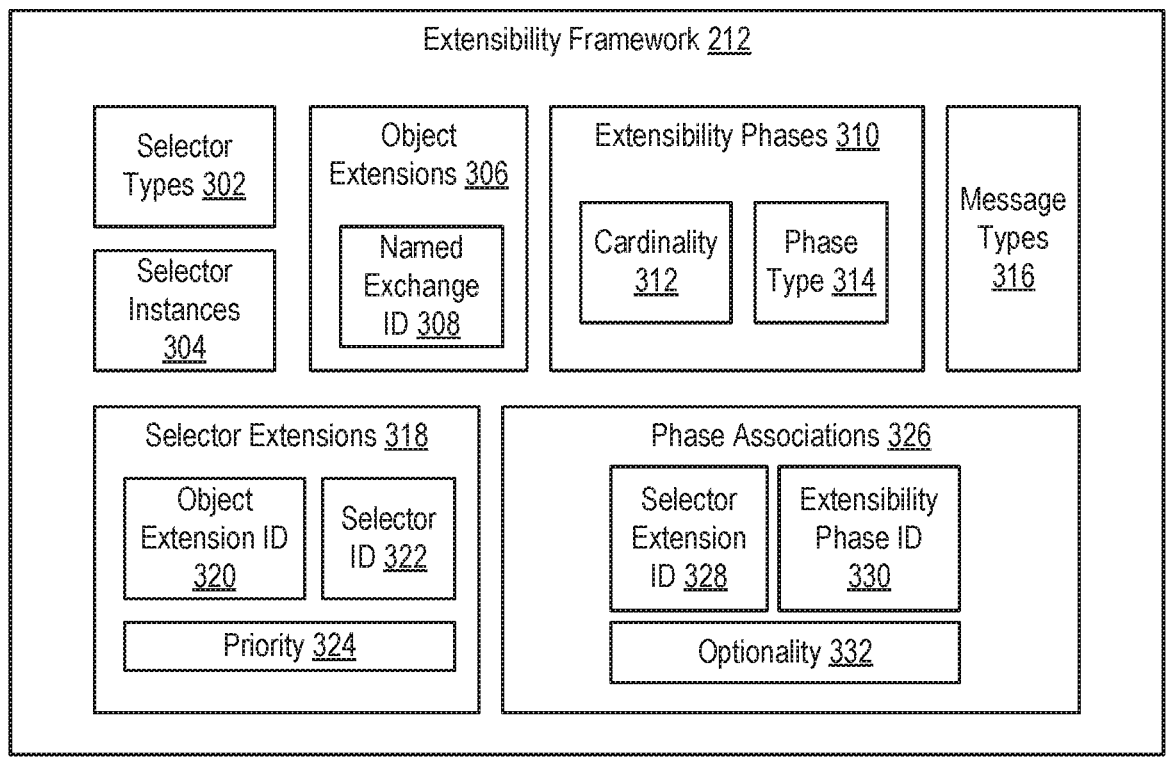
FIG. 3 is a block diagram depicting functional components of an extensibility framework according to an embodiment.

FIG. 3 is a block diagram depicting functional components of extensibility framework 212 according to an embodiment. Extensibility framework 212 provides objects comprising selector types 302, selector instances 304, object extensions 306, extensibility phases 310, message types 316, selector extensions 318, and phase associations 326. Object extensions 306 represent external services that are registered with cloud director 152. Each registered external service is represented by an object extension 306. Each object extension 306 includes a named exchange identifier (ID) 306 that identifies an external service exchange for the external service. External services registered with cloud director using extensibility framework 212 are also referred to as "extensions."

A selector provides scope of execution for associating extensions and phases. Selector types 302 represent classes of selectors and selector instances 304 represent specific instances of selectors. Example selectors include provider vDC, organization vDC (tenant vDC), organization, catalog, and the like. Example selector types 302 include urn:selector:providerVdc, urn:selector:organizationVdc, urn:selector:organization, and urn:selector:catalog corresponding to the example selectors. A selector instance 304 can be urn:selector:organization:tenant1, for example, which represents a specific instance of the selector type urn:selector:organization identified by "tenant1." Although selector types 302 and selector instances 304 are described in terms of uniform resource names (URNs), other formats can be used.

Selector extensions 318 relate extensions and selectors. In particular, each selector extension 318 includes an object extension ID 320 and a selector ID 322. Object extension ID 320 identifies an object extension 306. Selector ID 322 identifies either a selector type 302 or a selector instance 304. An object extension 306 can be associated with a selector type 302 to associate a given external service with a class of selectors (e.g., all organization vDCs. Alternatively, an object extension 306 can be associated with a selector instance 304 to associate a given external service with a specific selector instance (e.g., a specific organization VDC known as "tenant1). In this manner, external services can have various scopes defined in terms of selector types and selector instances. Each selector extension 318 can also include a priority 324. Priority 324 can be used to define a hierarchy among the difference external services (e.g., defining higher priority external services versus lower priority external services).

Extensibility phases 310 represent extensible phases of workflows of cloud director 152. Each extensibility phase 310 includes a cardinality 312 and a phase type 314. Cardinality 312 can be one or more than one. A cardinality of one indicates that the given extensible phase can have a single phase association. A cardinality of more than one indicates that the given extensible phase can have more than one phase association. Phase type 314 indicates a type of communication employed by the phase. Example phase types include asynchronous communication, request/response communication, needs-approval communication, and the like. For asynchronous communication, cloud director 152 will send a message to an associated external service and then continue on without waiting for a response. An example of asynchronous communication would be an extension that provides notification or auditing. For request/response communication, cloud director 152 sends a message and waits for a response from the external service. An example of request/response communication would be a request to create a VM and a response that the VM has been created. For needs-approval communication, cloud director 152 will send a message to an external service requesting the external service to approval or deny a particular operation. An example of needs-approval communication would be a request for approval to create a VM.

Phase associations 326 represent relations between selector extensions and extensible phases. Each phase association 326 includes a selector extension ID 328 and an extensibility phase ID 330. Selector extension ID 328 identifies a selector extension 318. Extensibility phase ID 330 identifies an extensibility phase 314. In this manner, each phase association 326 relates a given external service, having a particular scope, with a particular workflow phase. Each phase association 326 can also include an optionality field 332 that indicates whether the given phase association is optional or mandatory.

Message types 316 define the format and content of messages sent and consumed by particular extensible phases. That is, each extensible phase defines an appropriate message format for communication between cloud director 152 and external services with respect to the interaction needs of that phase. Each extensible phase that includes a communication protocol requiring a response can define an appropriate message format for the reply message from external services.

Those skilled in the art will appreciate that extensibility framework 212 as shown in FIG. 3 can have different variations. In general, extensibility framework 212 exposes extensible phases for association with external services. In the example described above, each external service is constrained by a scope defined by a selector type or selector instance. In another embodiment, external services can be directly associated with extensible phases without having a particular scope.

Figure 4:
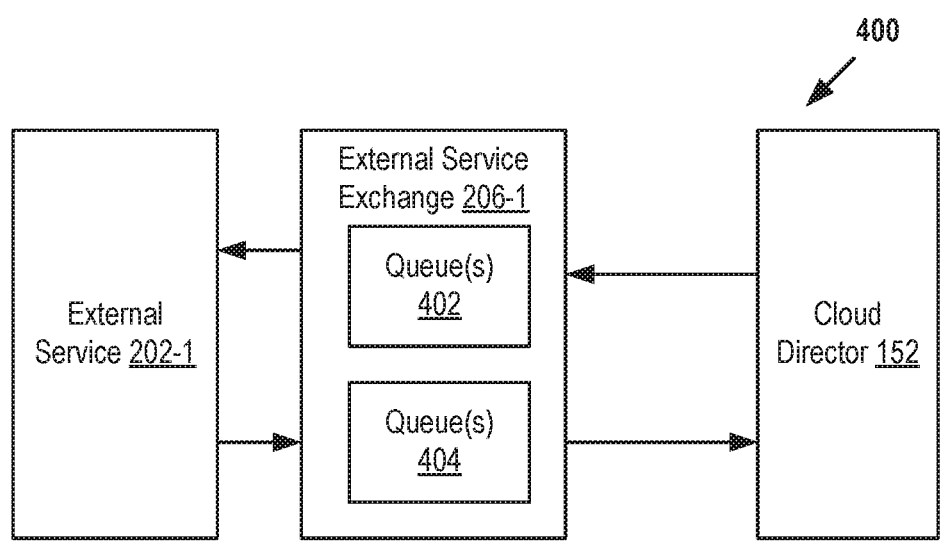
FIG. 4 is a block diagram depicting message exchange between a cloud director and an external service according to an embodiment.

FIG. 4 is a block diagram depicting message exchange between cloud director 152 and an external service. An external service 202-1 is associated with an external service exchange 206-1 in the message broker. An administrator can define one or more queues 402 for receiving messages from cloud director 152. Cloud director 152 will publish each message with a key. Each queue 402 can be defined based on a key, including wildcards. In this manner, queue(s) 402 can be established to capture particular set(s) of messages from cloud director 152 that target external service 202-1. External service exchange 206-1 also includes one or more queue(s) 404. External service 202-1 can return reply messages to cloud director 152 through queue(s) 404. Cloud director 152 can specify a key to use for the reply message so that external service 202-1 publishes the message to the appropriate queue 404.

Figure 5:
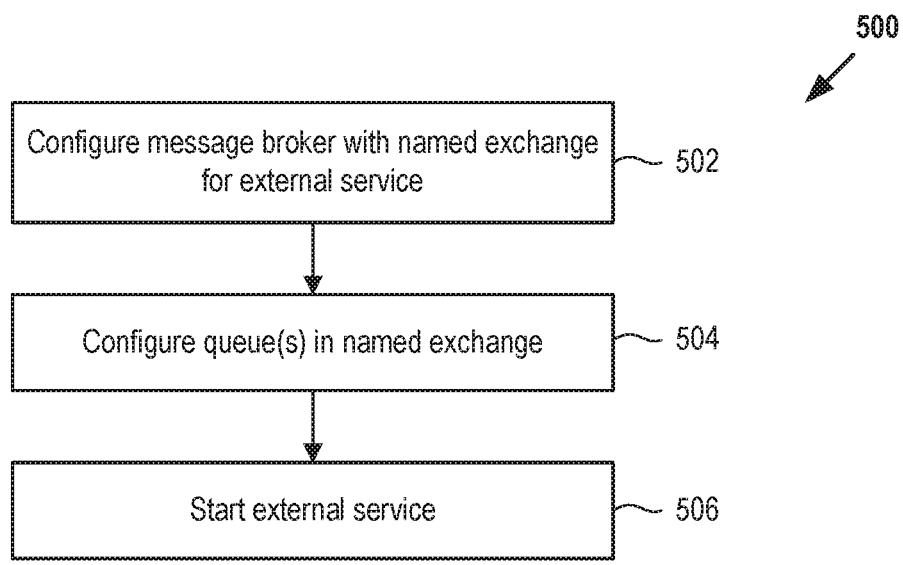
FIG. 5 is a flow diagram depicting a method of managing external services for use as extensions with a cloud director according to an embodiment.

FIG. 5 is a flow diagram depicting a method 500 of managing external services for use as extensions with cloud director 152 according to an embodiment. Method 500 begins at step 502, where an administrator configures message broker 204 with a named exchange for an external service 202 (e.g., an external service exchange 206). At step 504, the administrator configures queue(s) 402 in the named exchange. At step 506, the administrator starts the external service.

Figure 6:
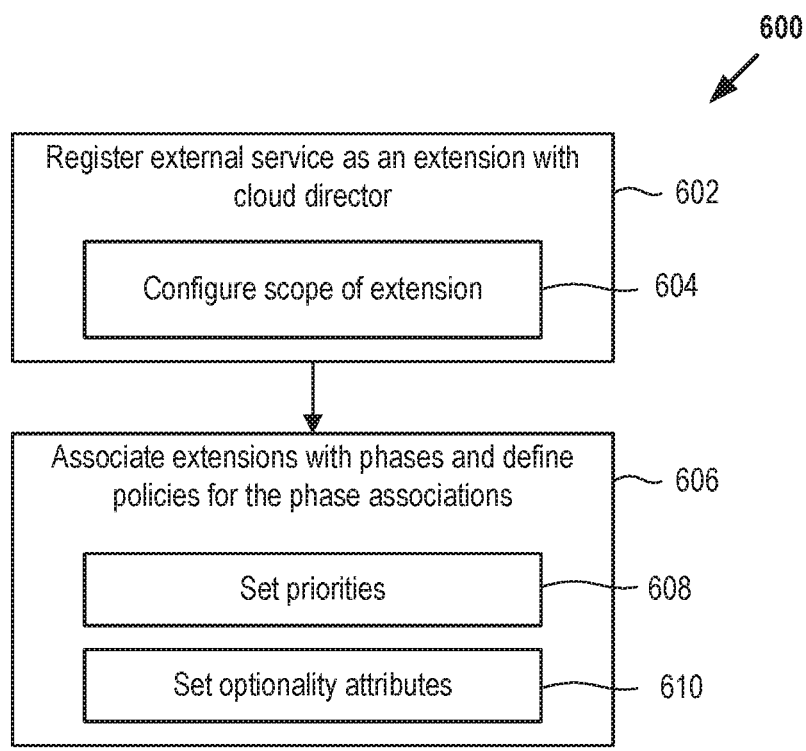
FIG. 6 is a flow diagram depicting a method of registering an external service with a cloud director as an extension according to an embodiment.

FIG. 6 is a flow diagram depicting a method 600 of registering an external service with cloud director 152 as an extension according to an embodiment. Method 600 begins at step 602, where an administrator registers an external service as an extension with cloud director 152. In an embodiment, the administrator registers the external service using API 210 of cloud director 152. At step 604, the administrator can configure the scope of the extension. For example, the extension can be limited in terms of selector type or in terms of a specific selector instance. In an embodiment, the administrator configures the scope of the extension using API 210 of cloud director 152.

At step 606, the administrator associates the extension with phase(s) and defines respective policy(ies) for the phase association(s). An extension can be associated with any number of workflow phases. A policy for a phase association includes priority and optionality information. Thus, at step 608, an administrator can set a priority for each extension. At step 610, an administrator can set an optionality attribute of each phase association.

Figure 7:
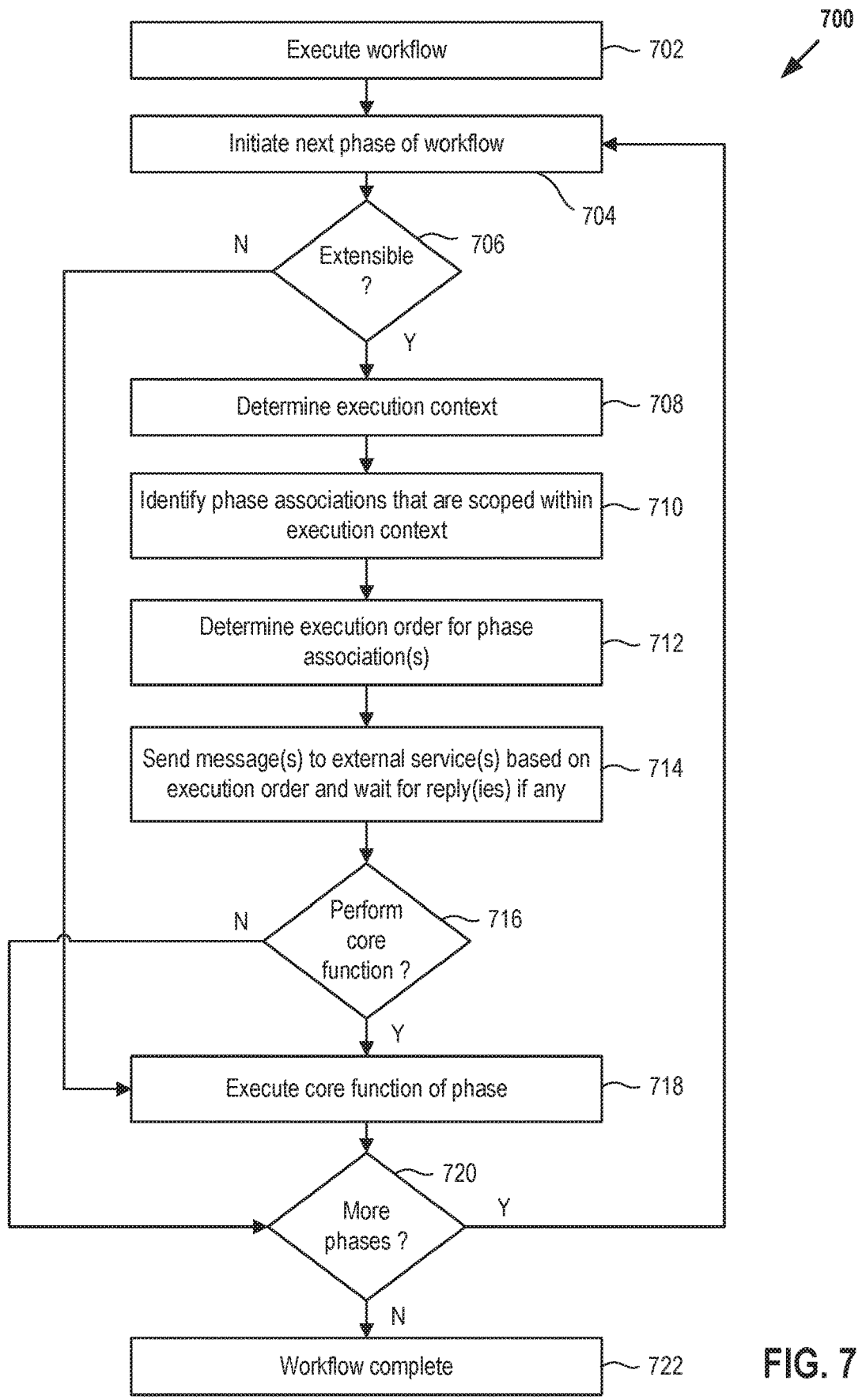
FIG. 7 is a flow diagram depicting a method of workflow execution in a cloud director according to an example.

FIG. 7 is a flow diagram depicting a method 700 of workflow execution in cloud director 152 according to an example. Method 700 begins at step 702, where cloud director 152 executes the workflow. In general, an administrator can interact with cloud director 152 through its REST API to trigger the execution of the workflow (e.g., deploying a VM). At step 704, cloud director 152 initiates the next phase of the workflow. In general, the workflow can include one or more phases, as discussed above. At step 706, cloud director 152 determines whether the current phase is extensible. If not, method 700 proceeds to step 718, where cloud director 152 executes the core function of the phase (e.g., gather requirements, create VM, etc.). If the phase is extensible, method 700 proceeds to step 708.

At step 708, cloud director 152 determines an execution context for the workflow. The execution context includes information related to one or more selectors used to determine a current scope. At step 710, cloud director 152 identifies phase association(s) that are scoped within the execution context. In general, the extensible phase may have one or more phase associations, each having a particular scope. Any phase associations that have a scope outside of that of the current execution context are ignored.

At step 712, cloud director 152 determines an execution order for the identified phase association(s). The execution order depends on the policy defined for each phase association and the cardinality of the particular extensible phase. If the extensible phase has a cardinality of one, then the execution order includes a single phase association. If the extensible phase has a cardinality more than one, then the execution order can include multiple phase associations. Cloud director 152 can determine which phase association(s) to select and in which order the selected phase association(s) are executed based on the priority and optionality attributes defined for the phase associations within the current scope.

At step 714, cloud director 152 sends message(s) to external service(s) based on the execution order. In some cases, cloud director 152 waits for one or more replies from external service(s), depending on the communication type employed by the phase. Cloud director 152 uses the message format defined for the current phase. Cloud director 152 sends the messages to a named exchange in the message broker specified for each external service.

At step 716, cloud director 152 determines whether the core function of the phase should be executed. In some cases, the external service(s) replace the core function of the phase and thus cloud director 152 does not execute the core function. In other cases, the external service(s) supplement the core function and cloud director 152 executes the core function of the phase. If the core function should be executed, method 700 proceeds to step 718. Otherwise, method 700 proceeds to step 720. At step 720, cloud director 152 determines whether the workflow includes more phases.

If so, method 700 returns to step 704. Otherwise, method 700 proceeds to step 722, where cloud director 152 completes the workflow.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of extending a cloud director configured to manage a cloud computing system, the method comprising:

receiving requests to register external services with the cloud director, the external services being external to the cloud director, the cloud director configured to execute a workflow to allocate virtual computing resources of the cloud computing system to a user, the workflow including a plurality of phases of execution;

generating phase associations for the external services between the external services and one or more extensible phases of the plurality of phases of execution, each respective phase association of the phase associations being between a respective external service of the external services and a particular extensible phase of the one or more extensible phases, wherein:

each respective phase association of the phase associations is associated with a respective policy that indicates a priority of the respective external service of the external services for the respective phase association with respect to the particular extensible phase to which the respective phase association corresponds;

the one or more extensible phases are for communicating messages with the external services;

the messages are for enabling the external services to access objects managed by the cloud director; and executing the workflow of the cloud director and, in response to reaching a given extensible phase of the one or more extensible phases in the plurality of phases of execution:

selecting a given external service of the external services based on the priority indicated in the policy of each respective phase association of the phase associations that corresponds to the given extensible phase; and sending a message from the cloud director to the given external service, the message including information for enabling the given external service to gain access to one or more objects managed by the cloud director.

2. The method of claim 1, further comprising:
assigning a scope of execution to each of the phase associations.

3. The method of claim 2, wherein an execution order of the phase associations is determined by:
determining at least one selector used to determine a current scope of execution of the workflow; and
comparing the scope of execution of each of the phase associations with the current scope of execution to determine whether to execute each of the phase associations.

4. The method of claim 1, wherein each request includes a named exchange of a message broker for a respective external service, and wherein the step of sending comprises:
publishing the message to each external service of a respective phase association of the phase associations to the named exchange of the respective external service.

5. The method of claim 1, further comprising:
receiving a response message at the cloud director from a given external service of a first phase association of the phase associations.

6. The method of claim 5, wherein the cloud director includes a named exchange of a message broker, and wherein the step of receiving the response message comprises reading the response message from the named exchange.

7. The method of claim 1, wherein each of the phase associations includes a communication mode selected from at least one of a blocking communication mode, an asynchronous communication mode, and a needs-approval communication mode.

8. The method of claim 1, wherein each respective phase association of the phase associations includes an indication of whether the respective phase association is mandatory or optional.

9. The method of claim 1, wherein the cloud director manages a hypervisor executing on a computer, and wherein the message including the information for enabling the given external service to gain access to the one or more objects managed by the cloud director comprises the message including information for enabling the given external service to gain access to one or more objects through the hypervisor executing on the computer and managed by the cloud director.

10. The method of claim 1, wherein the one or more objects comprise at least one of virtual machines, datastores, virtual network resources, or resource pools.

11. A non-transitory computer readable medium having stored thereon instructions, which when executed on a computer, cause the computer to perform a method of extending a cloud director configured to manage a cloud computing system, the method comprising:

receiving requests to register external services with the cloud director, the external services being external to the cloud director, the cloud director configured to execute a workflow to allocate virtual computing resources of the cloud computing system to a user, the workflow including a plurality of phases of execution;

generating phase associations for the external services between the external services and one or more extensible phases of the plurality of phases of execution, each respective phase association of the phase associations being between a respective external service of the external services and a particular extensible phase of the one or more extensible phases, wherein:

each respective phase association of the phase associations is associated with a respective policy that indicates a priority of the respective external service of the external services for the respective phase association with respect to the particular extensible phase to which the respective phase association corresponds;

the one or more extensible phases are for communicating messages with the external services;

the messages are for enabling the external services to access objects managed by the cloud director; and executing the workflow of the cloud director and, in response to reaching a given extensible phase of the one or more extensible phases in the plurality of phases of execution:

selecting a given external service of the external services based on the priority indicated in the policy of each respective phase association of the phase associations that corresponds to the given extensible phase; and sending a message from the cloud director to the given external service, the message including information for enabling the given external service to gain access to one or more objects managed by the cloud director.

12. The non-transitory computer readable medium of claim 11, wherein the step of associating comprises:
assigning a scope of execution to each of the phase associations.

13. The non-transitory computer readable medium of claim 12, wherein an execution order of the phase associations is determined by:

determining at least one selector used to determine a current scope of execution of the workflow; and comparing the scope of execution of each of the phase associations with the current scope of execution to determine whether to execute each of the phase associations.

14. The non-transitory computer readable medium of claim 11, wherein each request includes a named exchange of a message broker for a respective external service, and wherein the step of sending comprises:

publishing the message to each external service of a respective phase association of the phase associations to the named exchange of the respective external service.

15. The non-transitory computer readable medium of claim 11, further comprising:

receiving a response message at the cloud director from a given external service of a first phase association of the phase associations.

16. The non-transitory computer readable medium of claim 15, wherein the cloud director includes a named exchange of a message broker, and wherein the step of receiving the response message comprises reading the response message from the named exchange.

17. The non-transitory computer readable medium of claim 11, wherein each of the phase associations includes a communication mode selected from at least one of a blocking communication mode, an asynchronous communication mode, and a needs-approval communication mode.

18. The non-transitory computer readable medium of claim 11, wherein each respective phase association of the phase associations includes an indication of whether the respective phase association is mandatory or optional.

19. The non-transitory computer readable medium of claim 11, wherein the one or more objects comprise at least one of virtual machines, datastores, virtual network resources, or resource pools.

20. A computer system, comprising:

a hardware platform having a central processing unit (CPU) and a memory; and a software platform having code implementing a cloud director configured to manage a cloud computing system, the code stored in the memory and configured for execution by the CPU to:

receive requests to register external services with the cloud director, the external services being external to the cloud director, the cloud director configured to execute a workflow to allocate virtual computing resources of the cloud computing system to a user, the workflow including a plurality of phases of execution;

generate phase associations for the external services between the external services and one or more extensible phases of the plurality of phases of execution, each respective phase association of the phase associations being between a respective external service of the external services and a particular extensible phase of the one or more extensible phases, wherein:

each respective phase association of the phase associations is associated with a respective policy that indicates a priority of the respective external service of the external services for the respective phase association with respect to the particular extensible phase to which the respective phase association corresponds;

the one or more extensible phases are for communicating messages with the external services;

the messages are for enabling the external services to access objects managed by the cloud director; and execute the workflow of the cloud director and, in response to reaching a given extensible phase of the one or more extensible phases in the plurality of phases of execution:

select a given external service of the external services based on the priority indicated in the policy of each respective phase association of the phase associations that corresponds to the given extensible phase; and send a message from the cloud director to the given external service, the message including information for enabling the given external service to gain access to one or more objects managed by the cloud director.

\* \* \* \* \*